United States Patent
Navarro, Sr. et al.

(10) Patent No.: US 6,832,440 B2
(45) Date of Patent: Dec. 21, 2004

(54) SPINDLE SQUARING DEVICE AND METHOD OF OPERATION

(76) Inventors: Joseph R. Navarro, Sr., 1991 Poarch Rd., Lincolnton, NC (US) 28092; Mariam M. Navarro, 1991 Poarch Rd., Lincolnton, NC (US) 28092

( * ) Notice: Subject to any disclaimer, the term of this patent is extended or adjusted under 35 U.S.C. 154(b) by 0 days.

(21) Appl. No.: 10/338,743

(22) Filed: Jan. 8, 2003

(65) Prior Publication Data

US 2004/0128849 A1 Jul. 8, 2004

(51) Int. Cl.⁷ ................................................ B23Q 17/22
(52) U.S. Cl. ........................... 33/638; 33/626; 33/642
(58) Field of Search ......................... 33/638, 533, 632, 33/641, 642, 644, 645, 502, 626, 535

(56) References Cited

U.S. PATENT DOCUMENTS

| | | | |
|---|---|---|---|
| 3,688,412 A | * | 9/1972 | Keener .................. 33/535 |
| 3,763,570 A | | 10/1973 | Andersen |
| 4,085,515 A | | 4/1978 | Darden |
| 4,376,341 A | * | 3/1983 | Lombardo .................. 33/642 |
| 4,406,069 A | * | 9/1983 | Clement .................. 33/642 |
| 4,434,558 A | * | 3/1984 | Face et al. .................. 33/533 |
| 4,437,803 A | | 3/1984 | Volna |
| 5,074,051 A | * | 12/1991 | Cordy et al. .................. 33/644 |
| 5,131,161 A | * | 7/1992 | Drag .................. 33/533 |
| 5,253,425 A | | 10/1993 | Wozniak |
| 5,454,170 A | * | 10/1995 | Cook .................. 33/645 |

OTHER PUBLICATIONS

Accudyne Corporation; EZ–TRAM; "Industrial Machine Trader"; Sep. 23, 2003; Pg. No. 43; vol. 20, Issue 39; A Hearland Industrial Group Publication; Fort Dodge, IA.

* cited by examiner

Primary Examiner—Diego Gutierrez
Assistant Examiner—Madeline Gonzalez

(57) ABSTRACT

A method and apparatus is disclosed for measuring and setting perpendicularity between the tool holding spindle and work surface of a machine tool. The device is a fixture comprised either in one piece or multiple assembled components of the following: a shaft or shank used to mount the device into the spindle of the machine, and a body having a reference plane perpendicular to the shaft to provide reference readings with platform or nesting features for secure mounting of two precision gauges arranged along one axis.

12 Claims, 2 Drawing Sheets

SPINDLE SQUARING DEVICE AND METHOD OF OPERATION

BACKGROUND OF INVENTION

This invention relates to the necessity of establishing and measuring perpendicularity of the spindle of a vertical or horizontal machine tool as it relates to the table, work-holding or tool-holding surface of the machine.

The prior art to manually establishing perpendicularity of a machine tool spindle to the workholding axis has traditionally been accomplished through labor intensive means. Perpendicularity must be established and quantifiably measured prior to setting up a manually operated spindle-type machine tool in order to verify the correct position of the workholding surface to the tool-holder. If the spindle is not aligned to the point at which 0.001 or less graduated dial indicator swept readings are identical at various points in the circumference the work-holding surface area, the quality of any work performed can be severely compromised or even rejected. Wozniak clearly describes the painstaking task of zeroing or squaring the head of a vertical milling machine in his patent (see U.S. Pat. No. 5,253,425, Wozniak, October 1983, Description of Prior Art, Par. 4.)

The drawbacks besides the obvious laboriousness of the prior at in squaring the spindle of a machine tool to its workholding surface are as follows: (a) The cumbersome nature of using a plurality of gauges and fixtures which must be assembled prior to use and dis-assembled after use; (b) The excessive amount of time needed to accomplish the task (as Wozniak states and as affirmed by other journeymen machinists 45 minutes to accomplish this using prior art method is considered average); (c) The physical discomfort using the prior art method which requires the machinist to hold one arm extended while repeatedly bending downward to observe the readings on the indicator for a prolonged amount of time; (d) The necessity of having to perform the task of squaring the head each and every time a new project is to be set up on the machine which may be numerous times each day or week depending on the schedule of work in the shop; (e) The back-up of work flow because of the lengthy nature of squaring the head of the spindle; (f) The necessity of having to utilize experienced machinists to perform a task which is, by its nature, time consuming and non-productive.

The design of manually operated spindle machines such as milling machines also complicate the process of squaring the spindle. These machines have an"off-center" pivot making it troublesome for even an experienced machinist to square since it is difficult to judge to amount of adjustment require to bring the spindle of the machine into a perpendicular position because of the angular position of the pivot in relation to the head and table. Generally, the accepted rule of thumb is that the head of the machine should be perpendicular to the workholding surface within 0.0005 inches in 6 inches (0.013 mm in 15.24 cm). However, frequent and time consuming adjustments are required since even the slightest movement may extrapolate into major misalignments because of the off-center nature of the machine tool's pivot.

Another variable which is difficult to negotiate in aligning the spindle to the workholding surface is the amount of play in the gears of the machine tool's spindle head. Since these machine tools have useful lives of well over ten years, normal usage causes the gears to wear. While this may not compromise the performance of the machine once it is properly squared and set-up, it does complicate the process of squaring the spindle head. At this point, the process of squaring the head can become more of an intuitive art than a mechanical one, with the machinist oftentimes guessing at the amount of alignment necessary to accommodate the unknown level of play in the gears.

SUMMARY OF INVENTION

The present invention provides a self-contained unit with features for permanently mounting measurement gauges eliminating the need for repetitious assembly and disassembly.

Once assembled, the unit is self-calibrating.

This device effectively eliminates the variable of "play" in the gears of the spindle head of the machine tool.

The direction of adjustment which the machinist must make is readily known and a measurable reading can be taken without having to tram the device.

The ease of use enables apprentice or entry-level employees to successfully tram or square the spindle head of a machine tool and its efficiency eliminates physical discomfort caused by the prior art.

The amount of time to square a spindle head machine utilizing this device is far less than the prior art.

This device allows standard tramming operation for confirmational readings without the need of a secondary device.

This device accurately squares the head of the spindle to any workholding surface or fixture that may be bolted to the table.

This device accurately calibrates the spindle head to known angles or compound angles when used with a sine bar or gauge block.

This device is lightweight and easily stored as a personal tool unlike the prior art tools which are cumbersome, bulky, and require multiple, unrelated components.

To the inventors' knowledge comprised of over 60 years cumulative experience in this field, no such device such as the present invention exists.

DETAILED DESCRIPTION

Figure 2:
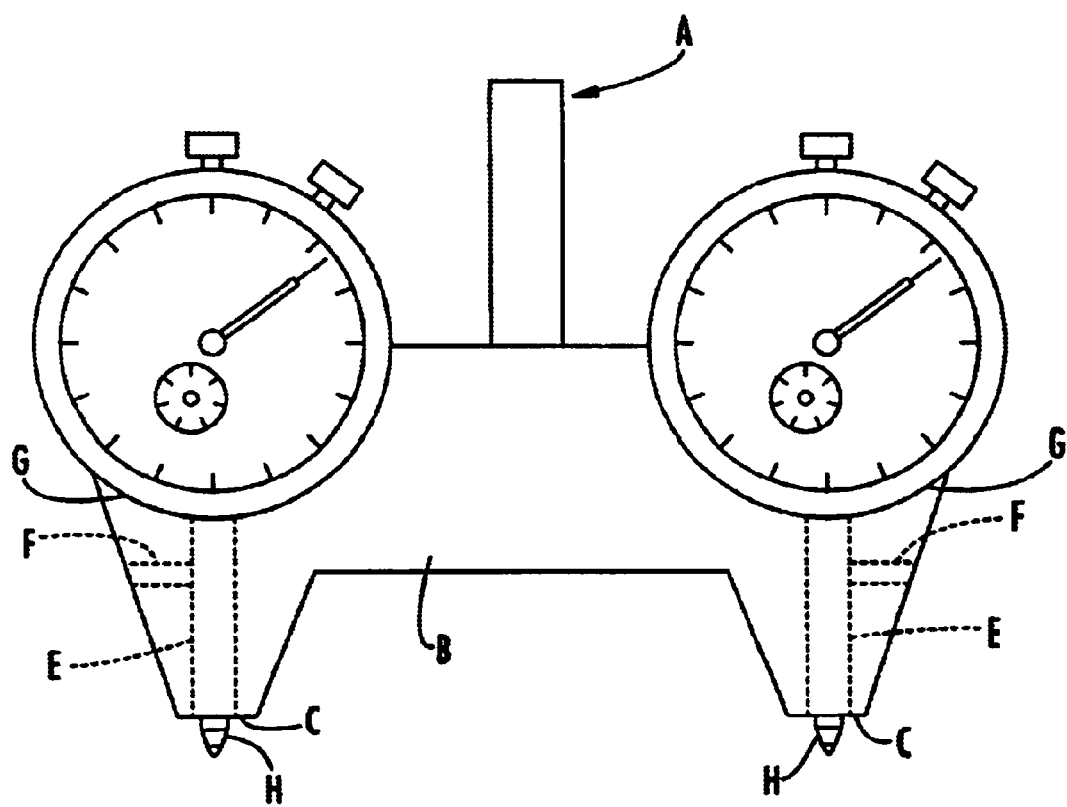
FIG. 2 is a front view of the spindle squaring device of the present invention detailing critical elements of the design which include: The shaft shank [A]; the reference surface plane which is designed to be in perpendicular relation to the shaft [A]. Modifiable areas of the design of the present invention include the nesting or holding feature [G] which can be changed to fit standard or custom gauges with various gradations of precision; clearance holes [E] and set screw or fastener holes [F] for securing the gauges mounted into the body of the invention.

Turning now more specifically to the drawings, FIG. 2 shows a typical embodiment of the present invention with two proximity or dial indicators mounted into the body of the device. The spindle squaring device has a shaft [A], a case hardened metal body [B], and a reference surface plane [C] which is perpendicular to the shank [A]. The present invention has a nesting feature [G] which holds proximity, dial, or other types of standard or custom gauges. The gauges are held in place by through holes [E] which accommodate the indicator shanks, and by set screw holes [F] on each end of the spindle squaring device body.

The spindle squaring device of the present invention with dial indicators mounted into the body is first placed in an upright position on a known flat surface such as a granite surface plate. Both indicators are set so that the needles are pointing to "0." Once this is done, the spindle squaring device has been calibrated. It is thus a self-calibrating unit unlike the prior art.

Figure 1:
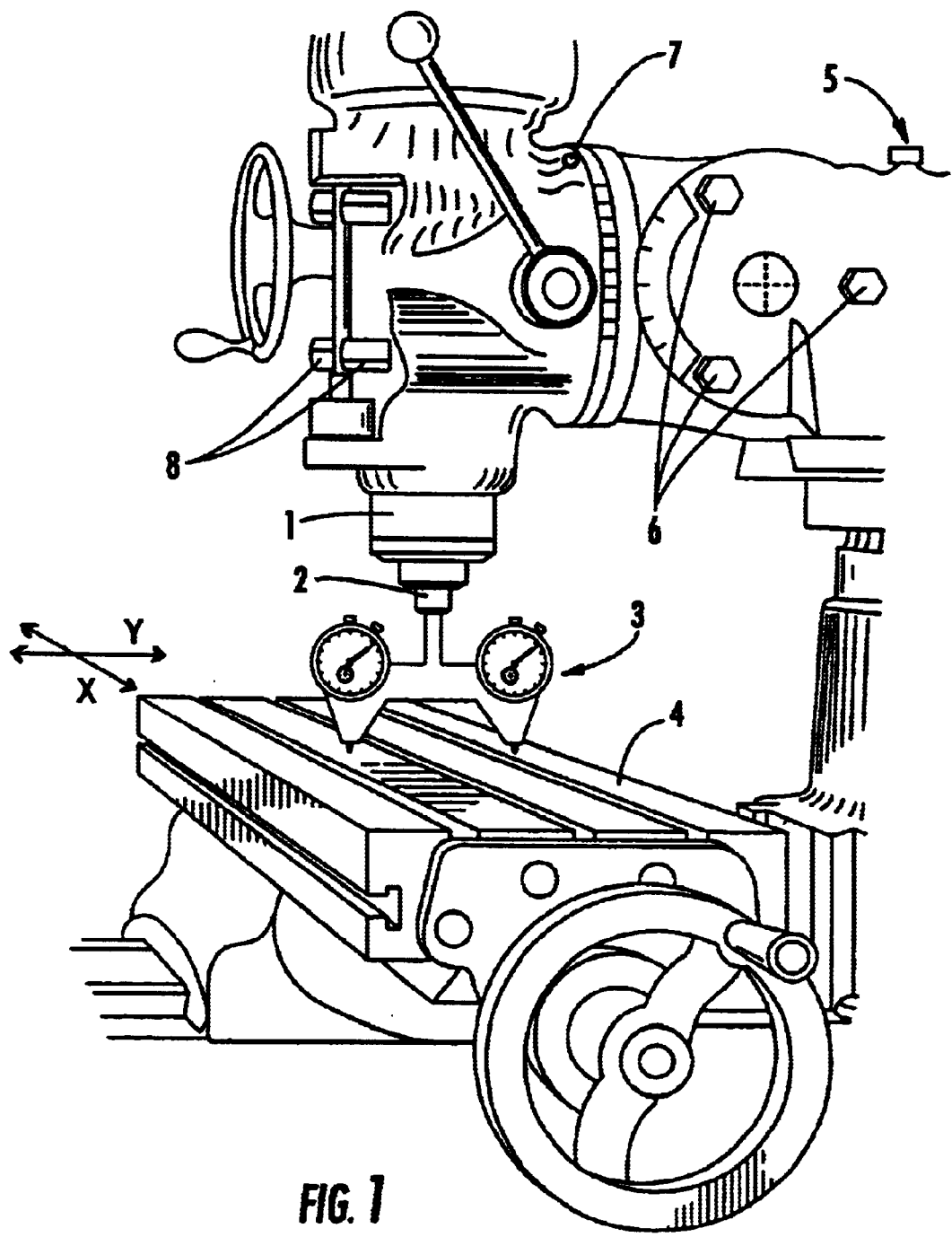
FIG. 1 is a view of the spindle squaring device of the present invention mounted into the spindle of a manual vertical type milling machine.

FIG. 1 shows how the present invention is used to tram or square the head of vertical milling machine to its workholding table. The shank of the present invention [FIG. 2, A], is placed in the collet of the milling machine spindle [FIGS. 1, 2]. The spindle is lowered until the device of the present invention makes measurable contact with the milling machine's table [FIGS. 1, 4]. "Measurable contact" is determined when needles on both indicators turn one full revolution. The machine is now ready to be squared on both the lateral and longitudinal axes (X and Y axes, respectively).

With the present invention secured as stated above, the machine can be adjusted on either axis axes-first. For illustrative purposes to explain use, the Y axis is adjusted first. As the adjusting screw for the V-axis [FIGS. 1, 5] is turned, the needles on the indicator dials of the present invention will rotate. The adjustment screw is turned left or right depending on the movement of the indicator needles until both needles point to identical numerical readings. When both indicator needles point to identical numerical reading, the spindle is square to that axis. The V-axis locking nuts [FIGS. 1, 6] are tightened, securing the spindle head in this position. The spindle is raised and the device of the present invention is rotated so that it is not parallel to the "X" axis. The device is lowered to the machine's table and measurable contact is made with the table of the machine [FIGS. 1, 4]. The X-axis adjustment screw 7 is turned causing the needles on the indicator dial to rotate. When both indicator needles are pointing to identical numerical readings, the spindle is square on the X-axis, The x-axis locking nuts are tightened [FIGS. 1, 8] securing the position of the head in relation to the table.

Most machinists wish to verify their work. The device of the present invention accommodates this without the necessity of introducing additional gauges, tools or removing the present invention. Verification of squareness is done by raising the spindle head and towering it again so that the indicator tips [FIG. 2, H] make measurable contact of only five gradations on the dial of the indicator or gauge against the machine tool [FIGS. 1, 4]. The present invention is then slowly rotated 360 degrees. Measurements are observed from the readings of one indicator only. As a rule of thumb, indicator readings remaining within one thousandth or one inch (0.001) or 0.001 TIR (one thousandth of one inch "total indicator reading") (equal to 0.025 mm) throughout the circular travel of the indicator represents an acceptable level of squareness for most workholding purposes. Readings are readily determined by observing the movement on the dial of one gauge. Once these readings are observed and verified, the machine is square and the present invention is removed.

What is claimed is:

1. A device for determining the angular relationship between a spindle of a machine tool and an associated work surface, comprising:
   a transversely-extending body including defining an integral reference surface on a bottom portion thereof, said body including a pair of nesting features for mounting a pair of measurement gauges, said nesting features being disposed at spaced-apart locations along an axis parallel to said reference surface each nesting feature having a concave arcuate profile for receiving a housing of a dial gauge;
   an elongated shank attached to said body, the longitudinal axis of said shank being aligned perpendicular to said reference surface; and
   first and second gauges mounted in respective ones of said nesting features, each of said gauges having a shaft carrying a movable measuring tip, said gauges being positioned relative to said reference surface such that each of said measuring tips can be moved, within the range of measurement of said gauge, to a position flush with said reference surface.

2. The device of claim 1 further comprising a pair of vertical holes for receiving the shafts of said gauges, each of said holes being formed through said body and extending from one of said nesting features to said reference surface.

3. The device of claim 2 further comprising means for clamping said shafts to said body.

4. The device of claim 3 wherein said means for clamping said shafts comprise:
   a pair of threaded set screw holes formed in said body, each of said set screw holes intersecting one of said vertical holes, and
   a set screw received in each of said set screw holes such that it may bear against one of said shafts.

5. The device of claim 1 wherein a lower portion of said body includes a pair of spaced-apart, downwardly-extending portions connected by a laterally-extending portion, wherein each of said downwardly-extending portions is aligned with one of said nesting features, and wherein each of said downwardly-extending portions has a flat formed thereon which is coplanar with said reference surface.

6. The device of claim 5 further comprising a pair of spaced-apart vertical holes formed through said body for receiving the shafts of said gauges, each of said holes extending from one of said nesting features to the corresponding one of said flats.

7. A method for setting a preselected angular relationship between a tool mounting assembly of a spindle head or a machine tool and a workholding surface, comprising the steps of:
   Providing an alignment device comprising a body having an integral planar reference surface on a bottom portion thereof, a shank extending upwardly from said body and perpendicular to said reference surface, and a pair of gauges disposed along an axis transverse to said shank in a spaced-apart relationship to each other and to said shank, each of said gauges having a measuring tip movable along an axis perpendicular to said reference surface;
   placing said alignment device against a planar calibration surface such that said measuring tips are flush with said reference surface, said measuring contact said calibration surface, and said reference surface contacts said calibration surface;
   adjusting said gauges to indicate an equal, preselected measurement;
   mounting said shank to said tool mounting assembly;
   positioning said alignment device such that said measuring tips contact said workholding surface, said reference surface does not contact said workholding surface, and said transverse axis is oriented in a first desired direction corresponding to a first plane; and
   adjusting the angular relationship of said tool mounting assembly to said workholding surface such that said gauges indicate measurements corresponding to the preselected angular orientation of said tool mounting assembly and said workholding surface in said first plane.

8. The method of claim 7 wherein the angular relationship of said tool mounting assembly to said workholding surface is adjusted such that said gauges indicate equal measurements.

9. The method of claim 7 further comprising:
   rotating said tool mounting assembly and said alignment device such that said lateral axis is aligned in a second direction corresponding to a second plane; and
   adjusting the angular relationship of said tool mounting assembly to said workholding surface such that said gauges indicate measurements corresponding to the preselected angular orientation of said tool mounting assembly and said workholding surface in said second plane.

10. The method of claim 9 wherein the angular relationship of said tool mounting assembly to said workholding surface is adjusted such that said gauges indicate equal measurements.

11. The method of claim 10 further comprising:
   rotating said alignment device about the axis of said shank while said alignment device is mounted in said tool mounting assembly and observing the indicated amount of movement of one of said measuring tips; and
   comparing the measured amount of motion of said measuring tip to a preselected upper limit.

12. A method for determining for determining the angular relationship between a tool mounting assembly of a spindle head of a machine tool and a workholding surface, comprising the steps of:
   providing an alignment device comprising a body having an integral planar reference surface on a bottom portion thereof, a shank extending upwardly from said body and perpendicular to said reference surface, and a pair of gauges disposed along an axis transverse to said shank in a spaced-apart relationship to each other and to said shank, each of said gauges having a measuring tip movable along an axis perpendicular to said reference surface;
   placing said alignment device against a planar calibration surface such that said measuring tips are flush with said reference surface, said measuring tips contact said calibration surface, and said reference surface contacts said calibration surface;
   adjusting said gauges to indicate an equal, preselected measurement;
   mounting said shank to said tool mounting assembly;
   positioning said alignment device such that said measuring tips contact said workholding surface, said reference surface does not contact said workholding surface, and said transverse axis is oriented in a first desired direction corresponding to a first plane; and
   observing the measurements indicated by said gauges.

* * * * *